US011921443B2

(12) United States Patent
Kim

(10) Patent No.: US 11,921,443 B2
(45) Date of Patent: Mar. 5, 2024

(54) TONER REFILL APPARATUS

(71) Applicant: Hewlett-Packard Development Company, L.P., Spring, TX (US)

(72) Inventor: Seung il Kim, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/777,254

(22) PCT Filed: Nov. 18, 2019

(86) PCT No.: PCT/US2019/062023
§ 371 (c)(1),
(2) Date: May 16, 2022

(87) PCT Pub. No.: WO2021/101509
PCT Pub. Date: May 27, 2021

(65) Prior Publication Data
US 2022/0390879 A1 Dec. 8, 2022

(51) Int. Cl.
*G03G 15/08* (2006.01)

(52) U.S. Cl.
CPC ..... *G03G 15/0894* (2013.01); *G03G 15/0863* (2013.01)

(58) Field of Classification Search
CPC ........... G03G 15/0865; G03G 15/0886; G03G 15/0877; G03G 15/0863; G03G 15/0894; G03G 15/0879
See application file for complete search history.

(56) References Cited

U.S. PATENT DOCUMENTS 5,461,466 A * 10/1995 Girard .................. G03G 15/104 396/626
5,970,273 A * 10/1999 Zenk .................... G03G 15/104 399/233

(Continued)

FOREIGN PATENT DOCUMENTS

CN 100422869 C 10/2008
CN 203849558 U 9/2014

(Continued)

OTHER PUBLICATIONS

International Search Report and Written Opinion dated Jul. 16, 2020, issued in PCT/US2019/062023, filed Nov. 18, 2019 (8 pages).

*Primary Examiner* — Jessica L Eley
(74) *Attorney, Agent, or Firm* — Brooks, Cameron & Huebsch, PLLC

(57) ABSTRACT

According to examples, a toner refill apparatus may include a chamber to house a toner, in which the chamber may include an insertion section, the insertion section to be inserted into a refill port of a toner cartridge and including a discharge opening, the refill port including an electrical circuit component. The apparatus may also include a valve mechanism positioned at the discharge opening to control output of the toner from the chamber through the discharge opening, in which an actuator may engage the valve mechanism and may controllably open the valve mechanism. The apparatus may further include an electronic chip to be in electrical communication the electrical circuit component, in which a controller may activate the actuator based on a detection that the electronic chip is in contact with the electrical circuit component.

15 Claims, 5 Drawing Sheets

(56) References Cited

U.S. PATENT DOCUMENTS

| | | | | | |
|---|---|---|---|---|---|
| 6,088,560 | A * | 7/2000 | Zenk | G03G 15/0121 | |
| | | | | 222/DIG. 1 | |
| 7,840,166 | B2 * | 11/2010 | Schlageter | G03D 5/00 | |
| | | | | 399/258 | |
| 8,090,274 | B2 | 1/2012 | Kim et al. | | |
| 9,612,551 | B2 | 4/2017 | Mushika et al. | | |
| RE47,086 | E | 10/2018 | Taguchi et al. | | |
| 2008/0013967 | A1 | 1/2008 | Masubuchi | | |
| 2011/0288680 | A1 * | 11/2011 | Samain | B01F 33/84 | |
| | | | | 700/239 | |
| 2014/0356004 | A1 * | 12/2014 | Tsuritani | G03G 21/18 | |
| | | | | 399/262 | |

FOREIGN PATENT DOCUMENTS

| | | | |
|---|---|---|---|
| CN | 208991139 | U | 6/2019 |
| EP | 1335252 | A2 | 8/2003 |
| EP | 1560076 | A2 | 8/2005 |
| EP | 1840671 | A1 | 10/2007 |
| EP | 2641743 | A2 | 9/2013 |
| EP | 3004988 | A1 | 4/2016 |
| KR | 10-2010-0117165 | A | 11/2010 |
| KR | 101076035 | B1 | 10/2011 |
| KR | 10-1198959 | B1 | 11/2012 |
| KR | 10-1367805 | B1 | 2/2014 |
| KR | 20190125106 | A | 11/2019 |

* cited by examiner

TONER REFILL APPARATUS

CLAIM FOR PRIORITY

The present application is a national stage filing under 35 U.S.C 371 of PCT application number PCT/US2019/062023, having an international filing date of Nov. 18, 2019, the disclosure of which is hereby incorporated by reference in its entirety.

BACKGROUND

Printing devices may form images on media using toner stored in a toner cartridge. The toner in the toner cartridge may be depleted as the toner is used to form the images. In some types of printing devices, the toner cartridge may be removed from the toner cartridge and replaced after the toner has been depleted. In other types of printing devices, the toner cartridge may include a refill port through which toner may be supplied into the toner cartridge.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms “a” and “an” are intended to denote at least one of a particular element. As used herein, the term “includes” means includes but not limited to, the term “including” means including but not limited to. The term “based on” means based at least in part on.

Disclosed herein are toner refill apparatuses, systems, and methods in which a controller may activate an actuator to manipulate a valve mechanism and control supply of toner from the toner refill apparatus into a toner cartridge. Particularly, the actuator may engage the valve mechanism when the toner refill apparatus is properly inserted into a refill port of a printing device. In addition, the controller may activate the actuator to cause the valve mechanism to move from a position in which the valve mechanism blocks a discharge opening in the toner refill apparatus to a position in which toner may flow through discharge opening. In some examples, the controller may automatically activate the actuator based on a determination that the toner refill apparatus has properly been inserted into the refill port.

Through implementation of the features of the present disclosure, a valve mechanism of a toner refill apparatus may automatically be controlled following insertion by a user of the toner refill apparatus into the refill port. In this regard, the user may not perform other actions, such as rotating the toner refill apparatus, following insertion of the toner refill apparatus into the refill port. As such, a toner cartridge may be refilled with toner from a toner refill apparatus with a reduced or limited number of user actions, which may result in a reduced number of errors that may occur during toner refilling operations.

Figure 1:
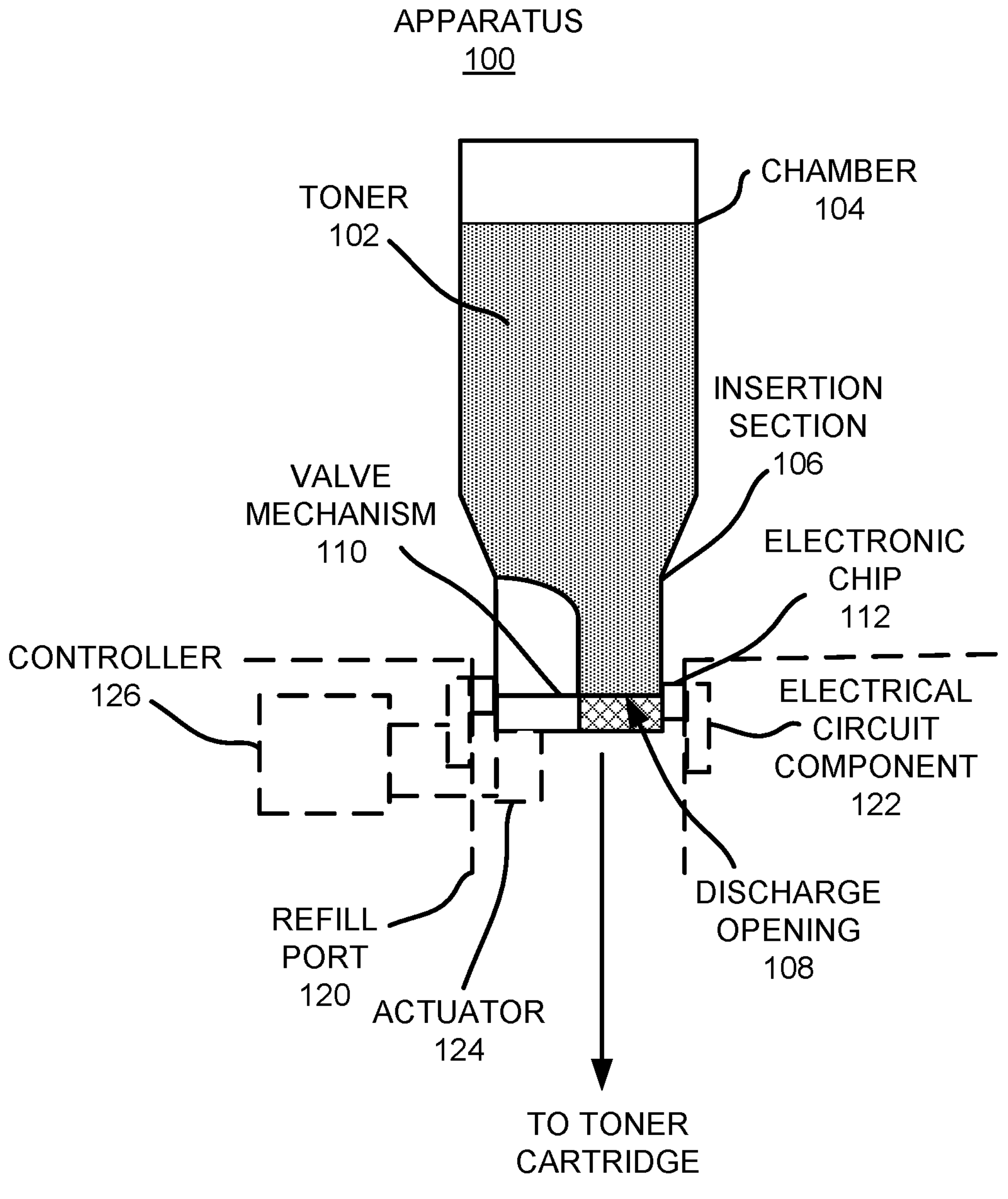
FIG. 1 depicts a block diagram of an example apparatus that may house toner to be supplied into a toner cartridge of a printing device.

Reference is first made to FIG. 1, which shows a block diagram of an example apparatus 100 that may house toner to be supplied into a toner cartridge of a printing device. It should be understood that the apparatus 100 depicted in FIG. 1 may include additional features and that some of the features described herein may be removed and/or modified without departing from the scope of the apparatus 100.

The apparatus 100, which may also be termed a toner refill apparatus 100, may house toner 102 and may include features to deliver the toner 102 to a refillable toner cartridge (not shown). Thus, for instance, the apparatus 100 may be employed to refill the toner cartridge of a printing device (not shown) with toner 102 instead of replacing the toner cartridge with a new toner cartridge. The toner 102 may be a powder mixture that the printing system may be used to print black and/or color text and images on media, such as paper. The printing system may be a laser printer, a photocopier, a multifunction printing device, or the like. The features of the printing system are depicted with dashed lines to denote that the printing system may not form part of the apparatus 100.

The apparatus 100 may include a chamber 104 to house the toner 102. The chamber 104 may be formed of any suitable material including a plastic, a metal, a ceramic, and/or combinations thereof. In addition, the chamber 104 may be sized to house an amount of toner appropriate for refilling a toner cartridge and may thus vary for different types of toner cartridges. The chamber 104 may further include a shape that may facilitate handling by a user for movement as well as for insertion into a printing system.

As shown, the chamber 104 may include an insertion section 106 including a discharge opening 108 through which the toner 102 may flow out of the chamber 104. The apparatus 100 may include a valve mechanism 110 positioned at the discharge opening 108. The valve mechanism 110 may prevent or block the flow of the toner 102 through the discharge opening 108 when the valve mechanism 110 is in a first (e.g., closed) position. In addition, toner 102 may flow past or through the valve mechanism 110 when the valve mechanism 110 is in a second (e.g., open) position.

The apparatus 100 may further include an electronic chip 112 that may, for instance, store data pertaining to the apparatus 100. The data pertaining to the apparatus 100 may include identification information of the apparatus 100, which may include manufacturer information, serial number, toner type, toner color, and/or the like. In some examples, the data may be encrypted to reduce unauthorized access to the data.

According to examples, the apparatus 100 may be inserted into a refill port 120 of the printing device when a toner cartridge is to be refilled. Particularly, the insertion section 106 may be inserted into the refill port 120 as shown in FIG. 1. In addition, the refill port 120 may include an electrical circuit component 122 that may be in contact with the electronic chip 112 when the insertion section 106 is properly inserted into the refill port 120. The electrical circuit component 122 may be an electrical contact through which electrical signals may be conveyed from the electronic chip 112.

In addition, when the insertion section 106 is properly inserted into the refill port 120, an actuator 124 may engage the valve mechanism 110. That is, for instance, the insertion section 106 may be considered as being properly inserted into the refill port 120 when the electronic chip 112 is in electrical contact with the electrical circuit component 122 and the actuator 124 is engaged with the valve mechanism 110. In some examples, the actuator 124 may include gearing or another mechanism that may be coupled to a motor such that, when the motor is activated, the actuator 124 may cause the valve mechanism 110 to move between a first position in which toner 102 flow is prevented and a second position in which toner 102 flow is enabled.

According to examples, the printing device may include a controller 126 that may be connected to the electrical circuit component 122 and the actuator 124. The controller 126 may control operations of the actuator 124 based on determinations as to whether the insertion section 106 is properly inserted into the refill port 120. The controller 126 may additionally or alternatively control operations of the actuator 124 based on other factors, such as, for instance, the apparatus 100 being authenticated using data stored in the electronic chip 112. The controller 126 may be a semiconductor-based microprocessor, a central processing unit (CPU), an application specific integrated circuit (ASIC), a field-programmable gate array (FPGA), and/or other hardware device. In some examples, the controller 126 may determine that the actuator 124 is to be activated based on a determination that the insertion section 106 has properly been inserted into the refill port 120.

Figure 2A:
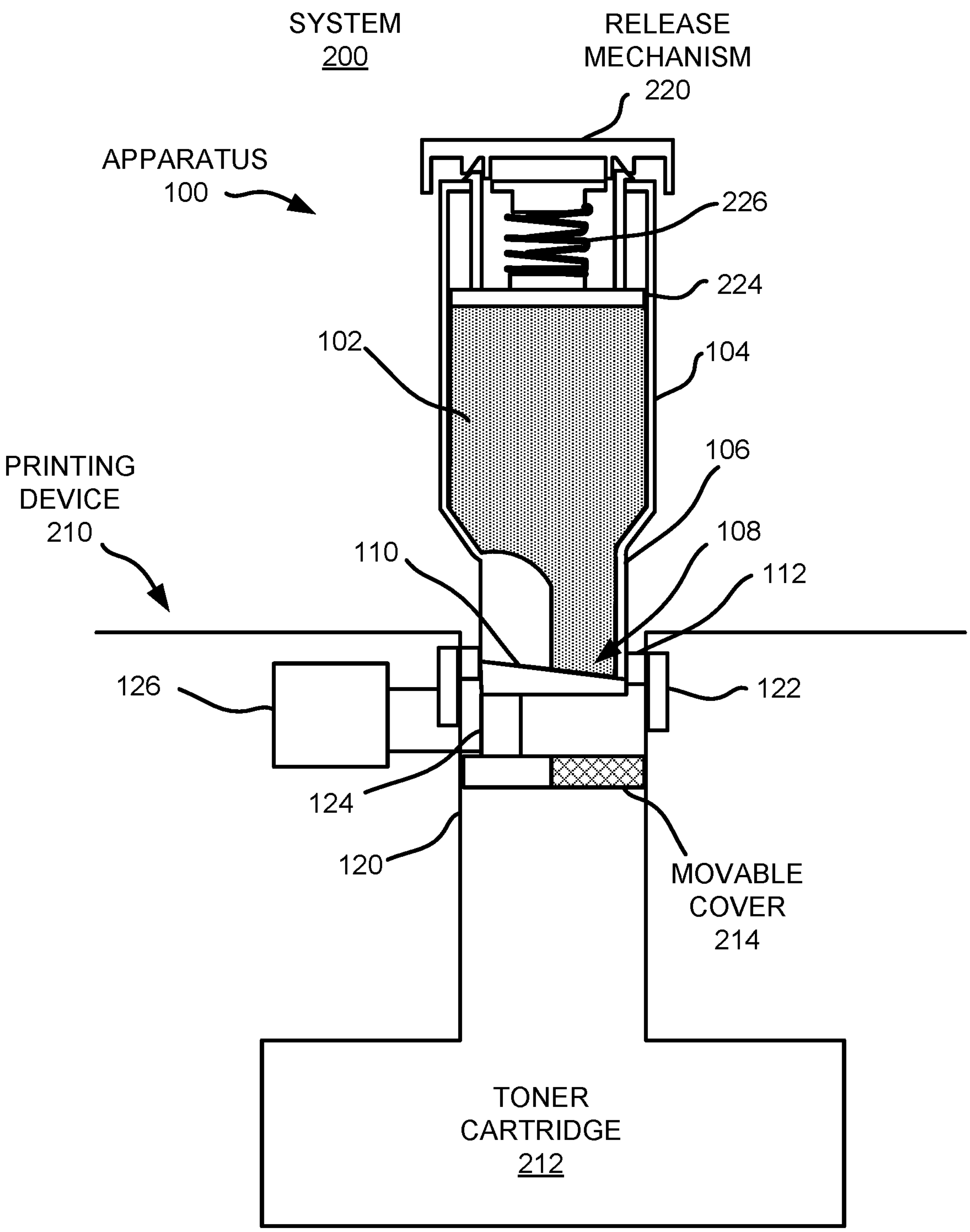
FIGS. 2A-2C, respectively, show block diagrams of an example system that may include the apparatus depicted in FIG. 1 and a printing device into which the apparatus may be inserted.
Figure 2B:
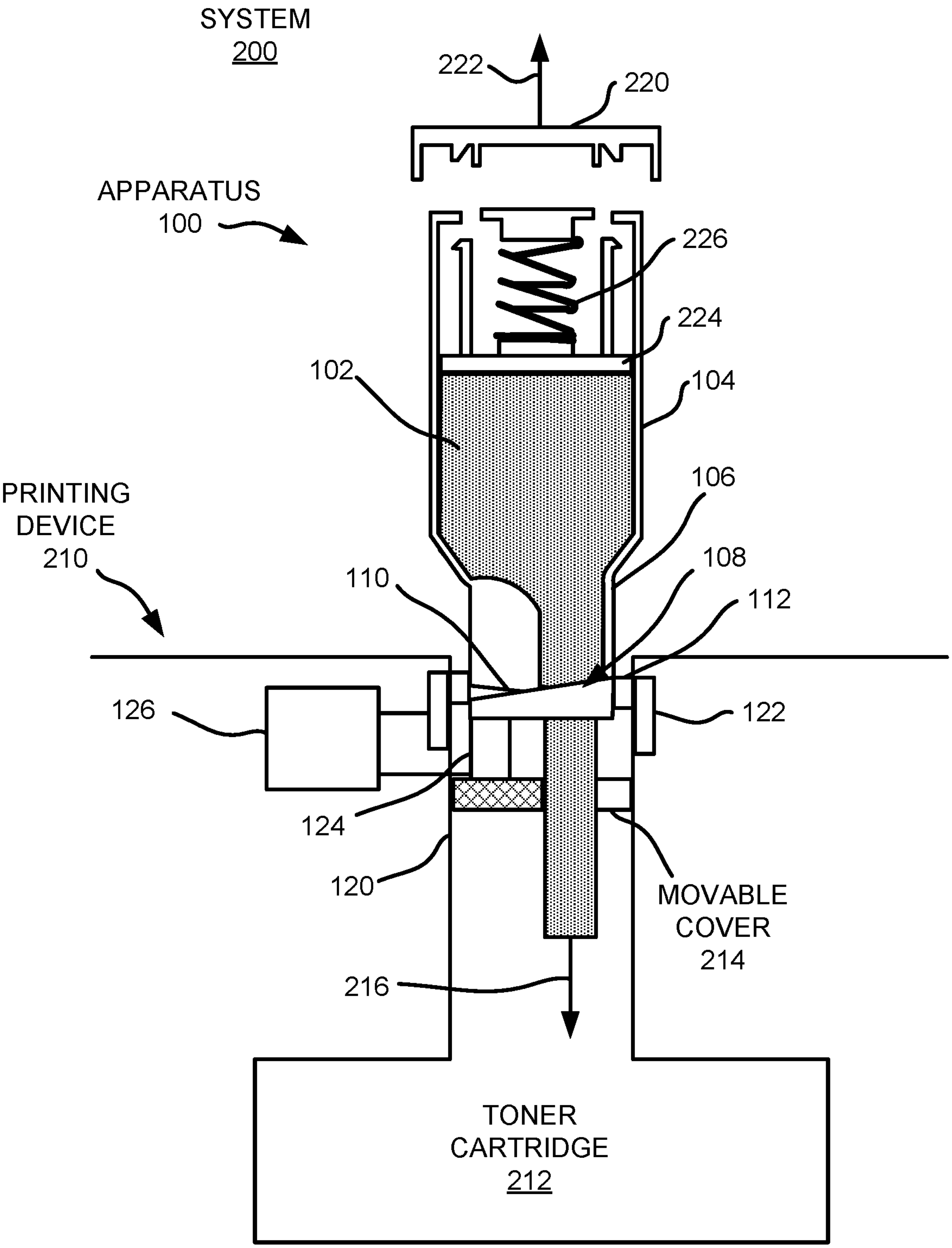
Figure 2C:
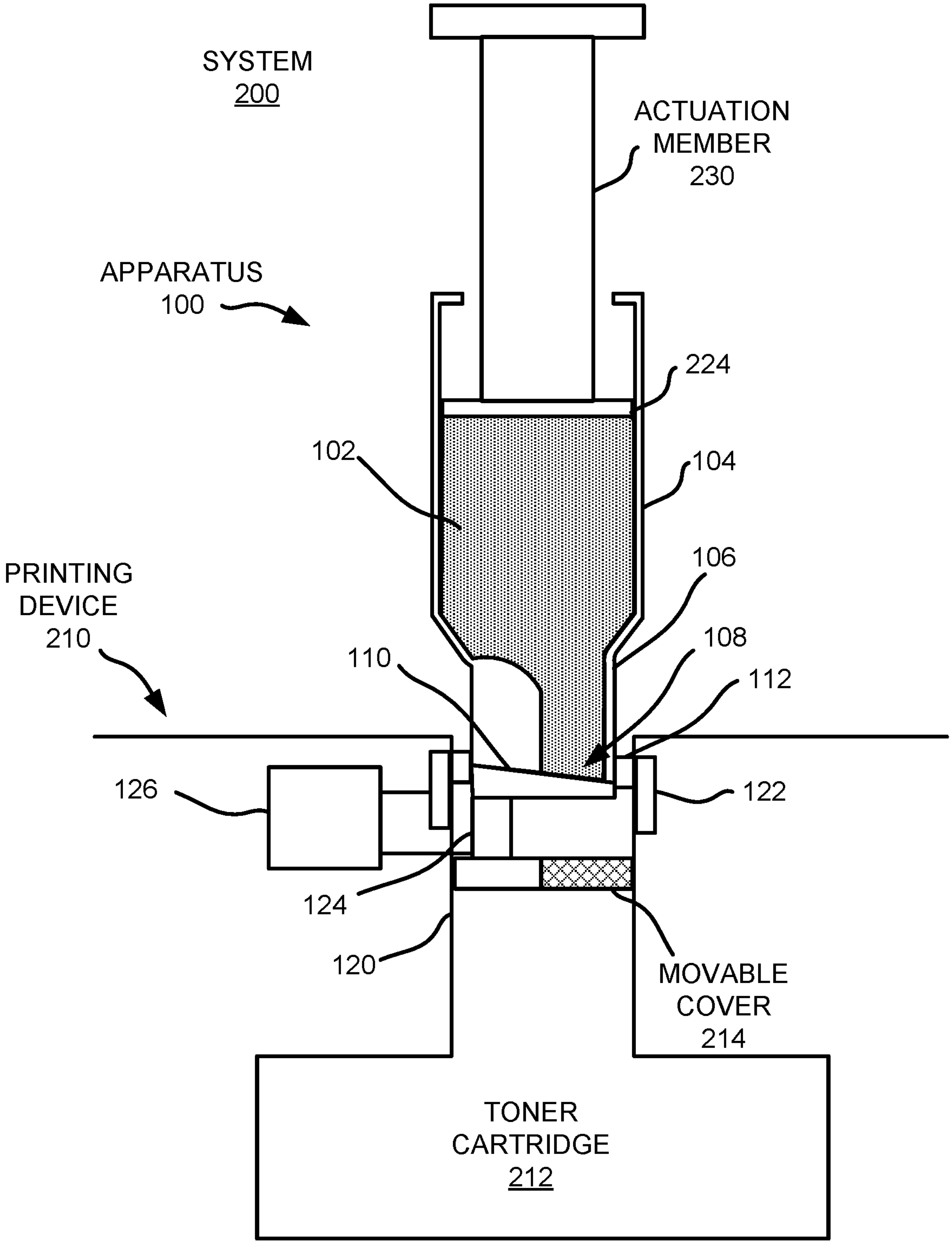

Turning now to FIGS. 2A-2C, there are respectively shown block diagrams of an example system 200 that may include the apparatus 100 depicted in FIG. 1 and a printing device 210 into which the apparatus 100 may be inserted. It should be understood that the system 200 depicted in FIGS. 2A-2C may include additional features and that some of the features described herein may be removed and/or modified without departing from the scope of the system 200.

As shown in FIG. 2A, the printing device 210 may include a toner cartridge 212 and the refill port 120. As discussed herein, the refill port 120 may receive an insertion section 106 of the apparatus 100 (toner refill apparatus 100), in which the apparatus 100 may include an electronic chip 112 and a valve mechanism 110. When the insertion section 106 is properly inserted into the refill port 120, the electronic chip 112 may contact or may otherwise be in electrical communication with an electrical circuit component 122 in the refill port 120. That is, when the toner cartridge 212 is ready to be refilled with toner, a user may insert the insertion section 106 of the apparatus 100 into the refill port 120 of the printing device 210.

The controller 126 may determine that the apparatus 100 has properly been inserted into the refill port 120 based on a detection of the electrical connection between the electrical circuit component 122 and the electronic chip 112. That is, in some examples, the electronic chip 112 may complete an electrical circuit (e.g., current flow) of the electrical circuit component 122 with the controller 126 and the controller 126 may detect the completion of the electrical circuit. In other examples, the electronic chip 112 may break an electrical circuit of the electrical circuit component 122 with the controller 126 and the controller 126 may detect the breaking of the electrical circuit. In any of these examples, the controller 126 may equate the completion or breaking of the electrical circuit with the proper insertion of the insertion section 106 into the refill port 120.

In some examples, the controller 126 may automatically activate the actuator 124 based on a determination that the insertion section 106 has properly been inserted into the refill port 120. In other examples, the controller 126 may wait until a further user action is performed prior to activating the actuator 124. Particularly, and as shown in FIG. 2, the apparatus 100 may include a release mechanism 220 that a user may manipulate, e.g., remove, rotate, flip, and/or the like, with respect to the chamber 104. In these examples, the electrical circuit discussed above between the electrical circuit component 122 and the controller 126 may be completed or broken when the release mechanism 220 is manipulated. In addition, the controller 126 may equate the completion or breaking of the electrical circuit with the proper insertion of the insertion section 106 into the refill port 120 and may activate the actuator 124 to allow for the toner 102 in the chamber 104 to flow through the discharge opening 108.

According to examples, a movable cover 214 may be provided in the refill port 120. In these examples, the actuator 124 (and/or another actuator) may also engage the movable cover 214 and may move the movable cover 214 as the actuator 124 moves the valve mechanism 110. The actuator 124 may move the movable cover 214 into a position that may enable the toner 102 to flow through the movable cover 214 and into the toner cartridge 212.

As shown in FIG. 2B, the release mechanism 220 may be manipulated, e.g., removed, in the direction denoted by the arrow 222, away from the chamber 104. In addition, the controller 126 may have activated the actuator 124 to open the valve mechanism 110 as well as to open the movable cover 214. In the example shown in FIGS. 2A and 2B, the actuator 124 may cause the valve mechanism 110 to rotate such that an open portion of the valve mechanism 110 may be aligned with the discharge opening 108. Likewise, the actuator 124 may cause the movable cover 214 to rotate such that an open portion of the movable cover 214 is aligned with the discharge opening 108 and/or an opening into the toner cartridge 212. Once in the open positions, the toner 102 housed in the chamber 104 may flow from the chamber 104 and into the toner cartridge 212 as indicated by the arrow 216.

In other examples, the valve mechanism 110 and/or the movable cover 214 may be other types of valve mechanisms, e.g., valve mechanisms that may be moved between a first vertical position that may block toner flow and a second vertical position that may enable toner flow, valve mechanisms that may slide from one position to another, and/or the like.

As further shown in FIGS. 2A and 2B, the apparatus 100 may further include a plunging mechanism 224 positioned inside of the chamber 104. In addition, the release mechanism 220 may hold the plunging mechanism 224 in a fixed position as shown in FIG. 2A and the plunging mechanism 220 may be released such that the plunging mechanism 224 may be movable within the chamber 104 when the release mechanism 220 is manipulated, e.g., removed, as shown in FIG. 2B. Additionally, a spring 226 may be provided in the chamber 104 to bias the plunging mechanism 224 toward the discharge opening 108. As such, when the release mechanism 220 is manipulated and the plunging mechanism 224 is released, the spring 226 may bias the plunging mechanism 224 toward the discharge opening 108, which may push the toner 102 through the discharge opening 108 and thus assist in the flow of the toner 102 into the toner cartridge 212.

In other examples, and as shown in FIG. 2C, instead of the release mechanism 220 and the spring 226, the apparatus 100 may include an actuation member 230 that may be connected to the plunging mechanism 224, In these examples, a user may depress the actuation member 230 to force the plunging mechanism 224 toward the discharge opening 108 to push the toner 102 through an opening in the valve mechanism 110.

Following the flow of the toner 102 out of the apparatus 100 and into the toner cartridge 212, the controller 126 may activate the actuator 124 again to move the valve mechanism 110 and the movable cover 214 to closed positions.

Figure 3:
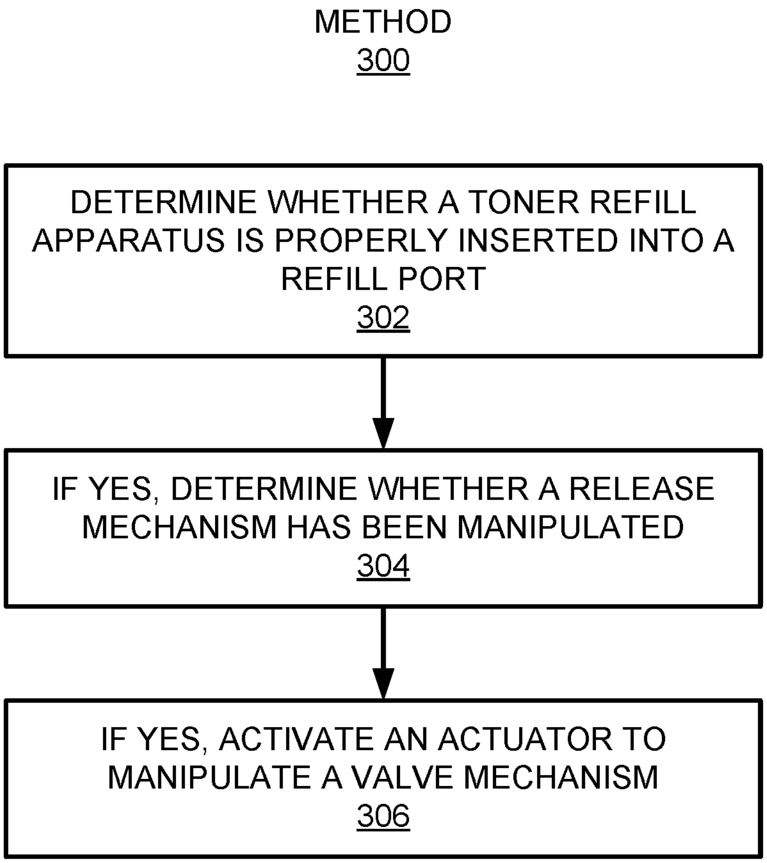
FIG. 3 depicts a flow diagram of an example method for activating an actuator to manipulate a valve mechanism in a toner refill apparatus.

Various manners in which the controller 126 may operate are discussed in greater detail with respect to the method 300 depicted in FIG. 3. Particularly, FIG. 3 depicts a flow diagram of an example method 300 for activating an actuator to manipulate a valve mechanism in a toner refill apparatus 100. It should be understood that the method 300 depicted in FIG. 3 may include additional operations and that some of the operations described therein may be removed and/or modified without departing from the scope of the method 300. The description of the method 300 is made with reference to the features depicted in FIGS. 1 and 2A-2C for purposes of illustration.

At block 302, the controller 126 may determine whether a toner refill apparatus 100 is properly inserted into a refill port 120 in fluid communication with a toner cartridge 212. As discussed herein, an actuator 124 may contact a valve mechanism 110 of the toner refill apparatus 100 when the toner refill apparatus 100 is properly inserted into the refill port 120. As also discussed herein, the controller 126 may determine that the toner refill apparatus 100 is properly inserted into the refill port 120 based on an electrical connection being established or removed between an electrical circuit component 122 in the refill port 120 and an electronic chip 112 on the apparatus 100.

At block 304, in addition or alternatively, based on a determination that the toner refill apparatus 100 is properly inserted into the refill port 120, the controller 126 may determine whether a release mechanism 220 on the toner refill apparatus 100 has been manipulated. The controller 126 may determine whether the release mechanism 220 has been manipulated based on a determination as to whether an electrical connection, e.g., current flow, through the chamber 104 has been broken or has been established as may occur when the release mechanism 220 is manipulated, e.g., removed.

At block 306, based on a determination that the release mechanism 220 has been manipulated, the controller 126 may activate the actuator 124 to manipulate the valve mechanism 110 of the toner refill apparatus 100 to cause toner 102 in the toner refill apparatus 100 to flow into the toner cartridge 212.

According to examples, the electronic chip 112 on the chamber 104 may have stored thereon data pertaining to the toner refill apparatus 100. The data pertaining to the apparatus 100 may include identification information of the apparatus 100 and/or toner 102 housed in the chamber 104 of the toner refill apparatus 100. In these examples, the controller 126 may access the data pertaining to the toner refill apparatus 100 from the electronic chip 112 via the electrical circuit component 122. In addition, the controller 126 may determine whether the toner refill apparatus 100 is authenticated based on the accessed data. That is, the controller 126 may determine whether the accessed data corresponds to and/or matches known data of a toner refill apparatus 100 that may be implemented to supply refill toner to the toner cartridge 212. The controller 126 may also or alternatively compare the accessed data, e.g., color, type, and/or the like, of the toner 102 to verify that the toner refill apparatus 100 houses an appropriate type and/or color of toner 102 to be supplied into the toner cartridge 212.

The controller 126 may further, based on a determination that the toner refill apparatus 100 is authenticated, determine that the actuator 124 is to be activated. The controller 126 may still further, based on a determination that the actuator 124 is to be activated, activate the actuator 124 to open the valve mechanism 110 to cause toner 102 in the toner refill apparatus 100 to flow into the toner cartridge 212.

Some or all of the operations set forth in the method 300 may be included as utilities, programs, or subprograms, in any desired computer accessible medium. In addition, the method 300 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A toner refill apparatus comprising:

a chamber to house a toner, the chamber including an insertion section, the insertion section to be inserted into a refill port of a toner cartridge and including a discharge opening, the refill port including an electrical circuit component;

a valve mechanism positioned at the discharge opening to control output of the toner from the chamber through the discharge opening, wherein an actuator is to engage the valve mechanism and to controllably open the valve mechanism when the chamber is inserted into the refill port of the toner cartridge; and an electronic chip to be in electrical communication with the electrical circuit component, wherein a controller is to activate the actuator based on a detection that the electronic chip is in contact with the electrical circuit component.

2. The toner refill apparatus of claim 1, further comprising:

a release mechanism, wherein manipulation of the release mechanism completes a circuit connection between the electronic chip and the electrical circuit component, and wherein completion of the circuit connection causes the controller to activate the actuator to open the discharge opening.

3. The toner refill apparatus of claim 2, further comprising:

a plunging mechanism positioned inside of the chamber, wherein manipulation of the release mechanism further enables the plunging mechanism to be movable within the chamber.

4. The toner refill apparatus of claim 3, further comprising:

a spring to force the plunging mechanism toward the discharge opening.

5. The toner refill apparatus of claim 3, wherein the plunging mechanism comprises an actuation member to be depressed by a user.

6. The toner refill apparatus of claim 1, wherein the valve mechanism comprises an open section and a closed section and wherein the actuator is to rotate the valve mechanism to cause the open section to be positioned in the discharge opening and enable the toner to flow through the discharge opening.

7. The toner refill apparatus of claim 1, wherein the valve mechanism comprises a movable blocking element and wherein the actuator is to move the blocking element to enable the toner to flow through the discharge opening.

8. A system comprising:

a toner cartridge;

a refill port to receive an insertion section of a toner refill apparatus, the toner refill apparatus including an electronic chip and a valve mechanism;

an electrical circuit component to be in electrical communication with the electronic chip;

an actuator to engage the valve mechanism; and a controller to:

determine when the actuator is to be activated based on a determination that the electrical circuit is in electrical communication with the electronic chip when the toner refill apparatus is inserted into the refill port; and based on a determination that the actuator is to be activated, activate the actuator to open the valve mechanism to cause toner in the toner refill apparatus to flow into the toner cartridge.

9. The system of claim 8, wherein the electronic chip has stored thereon data pertaining to the toner refill apparatus, and wherein the controller is further to:

access the data pertaining to the toner refill apparatus;

determine whether the toner refill apparatus is authenticated based on the accessed data; and based on a determination that the toner refill apparatus is authenticated, determine that the actuator is to be activated.

10. The system of claim 8, further comprising:

the toner refill apparatus, the toner refill apparatus having:

a chamber to house toner, the chamber including the insertion section and the insertion section having a discharge opening;

the valve mechanism being positioned at the discharge opening; and a release mechanism to be manipulated by a user.

11. The system of claim 10, wherein the controller is to:

determine whether the release mechanism has been manipulated; and determine that the actuator is to be activated based on a determination that the release mechanism has been manipulated.

12. The system of claim 10, wherein the toner refill apparatus further comprises:

a plunging mechanism held inside of the chamber by the release mechanism, wherein manipulation of the release mechanism is to cause the plunging mechanism to be movable within the chamber; and a spring to force the plunging mechanism toward the discharge opening.

13. The system of claim 8, further comprising a movable cover in the refill port, wherein the actuator is to also engage the movable cover and to move the movable cover when activated.

14. A method comprising:

determining, by a controller, when a toner refill apparatus is properly inserted into a refill port in fluid communication with a toner cartridge, an actuator contacting a valve mechanism of the toner refill apparatus when the toner refill apparatus is properly inserted into the refill port;

based on a determination that the toner refill apparatus is properly inserted into the refill port, determining, by the controller, when a release mechanism on the toner refill apparatus has been manipulated; and based on a determination that the release mechanism has been manipulated, activating, by the controller, the actuator to manipulate the valve mechanism of the toner refill apparatus to cause toner in the toner refill apparatus to flow into the toner cartridge.

15. The method of claim 14, wherein the controller is to determine whether the release mechanism has been manipulated based on a condition of a current flow through a portion of the toner refill apparatus.

* * * * *